United States Patent
Ekpenyong

(10) Patent No.: US 9,923,690 B2
(45) Date of Patent: Mar. 20, 2018

(54) DYNAMIC SIGNALING OF THE DOWNLINK AND UPLINK SUBFRAME ALLOCATION FOR A TDD WIRELESS COMMUNICATION SYSTEM

(71) Applicant: TEXAS INSTRUMENTS INCORPORATED, Dallas, TX (US)

(72) Inventor: Anthony Edet Ekpenyong, Houston, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 248 days.

(21) Appl. No.: 14/450,931

(22) Filed: Aug. 4, 2014

(65) Prior Publication Data
US 2015/0043396 A1 Feb. 12, 2015

Related U.S. Application Data

(60) Provisional application No. 61/862,851, filed on Aug. 6, 2013, provisional application No. 61/883,504, filed on Sep. 27, 2013.

(51) Int. Cl.
*H04J 3/00* (2006.01)
*H04L 5/00* (2006.01)
(Continued)

(52) U.S. Cl.
CPC .......... *H04L 5/0053* (2013.01); *H04L 5/0092* (2013.01); *H04L 5/1438* (2013.01);
(Continued)

(58) Field of Classification Search
None
See application file for complete search history.

(56) References Cited

U.S. PATENT DOCUMENTS

2012/0320806 A1 12/2012 Ji et al.
2013/0336177 A1* 12/2013 Gao et al. ............ 370/280
(Continued)

FOREIGN PATENT DOCUMENTS

EP 2624487 8/2013
WO 201029295 11/2010
(Continued)

OTHER PUBLICATIONS

A.Z. Yonis, et al., "LTE-FDD and LTE-TDD for Cellular Communications", Progress in Electromagentics Research Symposium Proceedings, KL, Malaysia [on-line], Mar. 27-30, 2010 [retrieved on Nov. 11, 2014]. Retrieved from the Internet: <URL: https://www.google.ru/url?sa=t&rct=j&q=&esrc=s&source=web&cd=1&ved=0CBwQFjAA&url=https%3A%2F%2Fpiers.org%2Fpiersproceedings%2Fdownload.php%3File%3DcGllcnMyMDEyS3VhlcGFMdW1wdXJBM1A3XzE0NjcucGRmfDExMDkwNzlzNDMzNA%3D%3D&ei=ei=idhpVL-oJaTRygPPqYGICw&usg=AFQjCNGCjLQC8BftTBBjvhZ4DkuFqCIihg&sig2=fcUZ-vWYgcDzUXDJQhshiQ&bvm=bv.79142246,d.bGQ&cad=rjt>.
(Continued)

Primary Examiner — Edan Orgad
Assistant Examiner — Rebecca Song
(74) Attorney, Agent, or Firm — Ronald O. Neerings; Charles A. Brill; Frank D. Cimino

(57) ABSTRACT

An apparatus for use in a wireless communication network, comprising a processing resource configured to determine a time interval for periodic time division duplex (TDD) Uplink/Downlink (UL/DL) reconfiguration windows, generate a UL/DL reconfiguration command to indicate a dynamic TDD UL/DL allocation change, and encode the UL/DL reconfiguration command in a physical downlink control channel (PDCCH) data, and a radio front end (RF) interface coupled to the processing resource and configured to cause the encoded UL/DL reconfiguration command to be transmitted to a first of a plurality of wireless user equipment (UEs) in a first of the UL/DL reconfiguration windows, (Continued)

wherein the encoded UL/DL reconfiguration command is transmitted via a PDCCH to provide a fast TDD UL/DL reconfiguration.

46 Claims, 9 Drawing Sheets

(51) Int. Cl.
    *H04L 5/14*     (2006.01)
    *H04W 72/04*     (2009.01)
    *H04L 1/00*     (2006.01)

(52) U.S. Cl.
    CPC ....... *H04L 5/1469* (2013.01); *H04W 72/0446* (2013.01); *H04L 1/0072* (2013.01); *H04L 5/001* (2013.01); *H04L 5/0044* (2013.01); *H04L 5/0064* (2013.01)

(56) References Cited

U.S. PATENT DOCUMENTS

2014/0119261 A1*   5/2014   Wang et al. ................. 370/312
2015/0029910 A1*   1/2015   He et al. ..................... 370/280

FOREIGN PATENT DOCUMENTS

WO     2012121574     9/2012
WO     2014157996     10/2014

OTHER PUBLICATIONS

3GPP TSG RAN WG1 #73, R1-131945, "Signaling Mechanisms for Dynamic TDD UL/DL Reconfiguration", Third Generation Partnership Project (3GPP), Mobile Competence Centre; 650, Route Des Lucioles; F-06921, Sophia-Antipolis CED, Agenda Item: 6.2.3.2, Fukuoka, Japan, May 20-24, 2013.

\* cited by examiner

| UL/DL CONFIGURATION INDEXES | DL-TO-UL SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 4

| VALUE (HEXADECIMAL) | RNTI |
|---|---|
| 0000 | N/A |
| 0001-003C | RA-RNTI, C-RNTI, SEMI-PERSISTENT SCHEDULING C-RNTI, TEMPORARY C-RNTI, TPC-PUCCH-RNTI, AND TPC-PUSCH-RNTI |
| 003D-FFF3 | C-RNTI, SEMI-PERSISTENT SCHEDULING C-RNTI, TEMPORARY C-RNTI, TPC-PUCCH-RNTI, AND TPC-PUSCH-RNTI |
| FFF4-FFFC | RESERVED FOR FUTURE USE |
| FFFD | M-RNTI |
| FFFE | P-RNTI |
| FFFF | SI-RNTI |

FIG. 5

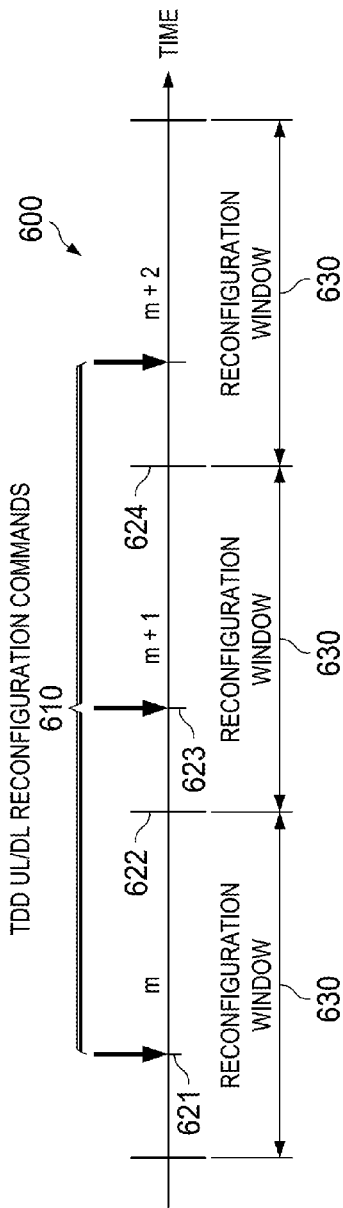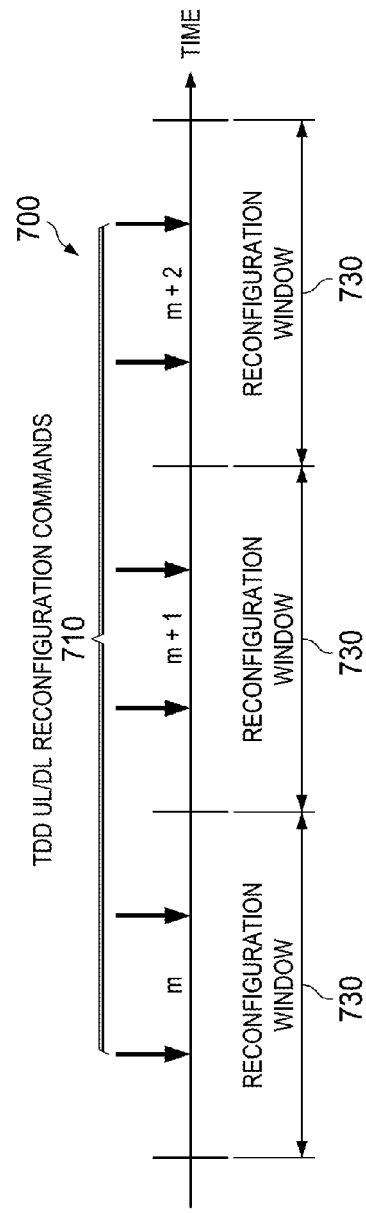

| SYSTEM BANDWIDTH (NUMBER OF RBS) | 6 | 15 | 25 | 50 | 75 | 100 |
|---|---|---|---|---|---|---|
| DCI FORMAT 1C PAYLOAD SIZE | 8 | 10 | 12 | 13 | 14 | 15 |
| DCI FORMAT 1A PAYLOAD SIZE | 23 | 25 | 27 | 29 | 30 | 31 |
FIG. 8
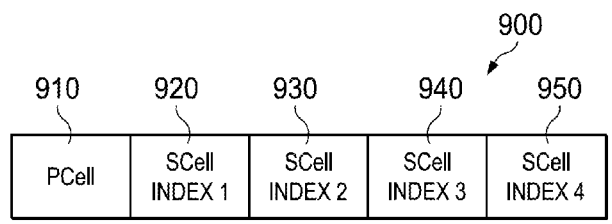
FIG. 9
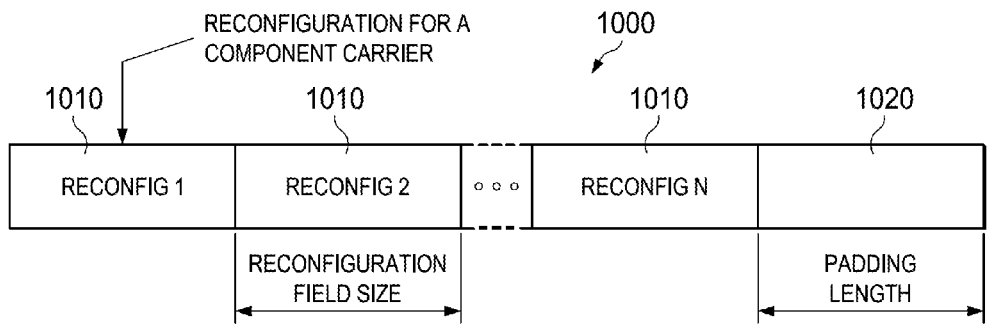
FIG. 10
| UE INDEXES | COMPONENT CARRIER (CC) CONFIGURATION | RECONFIGURATION INDEXES |
|---|---|---|
| UE1 | CC1 | {1} |
| UE2 | CC1, CC3 (SCell1 FOR UE2) | {1, 3} |
| UE3 | CC1, CC2 (SCell1 FOR UE3), CC4, (SCell2 FOR UE3) | {1, 2, 4} |
FIG. 11

DYNAMIC SIGNALING OF THE DOWNLINK AND UPLINK SUBFRAME ALLOCATION FOR A TDD WIRELESS COMMUNICATION SYSTEM

CROSS-REFERENCE TO RELATED APPLICATION

The present application claims priority to U.S. Provisional Patent Application 61/862,851 filed Aug. 6, 2013 by Anthony Edet Ekpenyong, and entitled "DYNAMIC SIGNALING OF THE DOWNLINK AND UPLINK SUBFRAME ALLOCATION FOR A TDD WIRELESS COMMUNICATION SYSTEM" and U.S. Provisional Patent Application 61/883,504, filed Sep. 27, 2013 by Anthony Edet Ekpenyong, and entitled "DYNAMIC SIGNALING OF THE DOWNLINK AND UPLINK SUBFRAME ALLOCATION FOR A TDD WIRELESS COMMUNICATION SYSTEM", both of which are incorporated herein by reference as if reproduced in their entirety.

BACKGROUND

Wireless communication networks may incorporate wireless terminal devices and base stations (BSs) for the purpose of providing communications services, such as telephony, data, video, messaging, chat, and broadcast. Multiple wireless terminals may be connected to a serving cell that is controlled by a BS. Wireless networks may employ various access schemes, which may include frequency division multiple access (FDMA), time division multiple access (TDMA), code division multiple access (CDMA), orthogonal frequency division multiple access (OFDMA), and single-carrier frequency division multiple access (SC-FDMA). A BS may also be referred to as a NodeB in Universal Mobile Telecommunications System (UMTS), an evolved NodeB (eNB) in Long-Term Evolution (LTE) specified by the Third Generation Partnership Project (3GPP), a base transceiver system (BTS), or an access point (AP)

In general, an eNB may be a fixed hardware (e.g. not mobile), but in some cases, such as when deployed in a car, may also be mobile. A wireless terminal device may be a portable hardware and may be referred to as a user equipment (UE), a mobile station, a cellular phone, a personal digital assistant (PDA), or a wireless modem card. In wireless communication networks, uplink (UL) communication may refer to communication from a UE to an eNB, while downlink (DL) communication may refer to communication from an eNB to a UE. An eNB may comprise radio frequency (RF) transmitters and receivers used to directly communicate with UEs, which may either be in a fixed location or freely move around the eNB. Similarly, each UE may comprise RF transmitters and receivers used to communicate directly with the eNB.

SUMMARY

A dynamic time division duplex (TDD) Uplink/Downlink (UL/DL) reconfiguration signaling scheme for a TDD wireless communication system is disclosed herein. In one embodiment, an apparatus for use in a wireless communication network includes a processing resource and a RF interface coupled to the processing resource. The processing resource is configured to determine a time interval for periodic TDD UL/DL reconfiguration windows. The processing resource is further configured to generate a UL/DL reconfiguration command to indicate a dynamic TDD UL/DL allocation change. The processing resource is further configured to encode the UL/DL reconfiguration command in a physical downlink control channel (PDCCH) data. The RF interface is configured to cause the encoded UL/DL reconfiguration command to be transmitted to a first of a plurality of wireless UEs in a first of the UL/DL reconfiguration windows. The encoded UL/DL reconfiguration command is transmitted via a PDCCH to provide a fast TDD UL/DL reconfiguration.

In another embodiment, a method for signaling a dynamic TDD UL/DL allocation change in a wireless communication network includes determining a time interval for periodic TDD UL/DL reconfiguration windows. The method further includes generating a UL/DL reconfiguration command to indicate the dynamic TDD UL/DL allocation change. The method further includes encoding the UL/DL reconfiguration in a PDCCH data. The method further includes transmitting the encoded UL/DL reconfiguration command to a first of a plurality of wireless UEs in a first of the UL/DL reconfiguration windows via a PDCCH to provide a fast TDD UL/DL reconfiguration.

In yet another embodiment, an apparatus for use in a wireless communication network includes a receiver and a processing resource coupled to the receiver. The receiver is configured to receive a TDD UL/DL reconfiguration schedule comprising periodic TDD UL/DL reconfiguration windows. The receiver is further configured to receive a plurality of physical layer downlink control information (DCI) messages from a wireless BS via a PDCCH. The processing resource is configured to determine that a first of the received DCI messages comprises a UL/DL reconfiguration command indicating a TDD UL/DL allocation change. The processing resource is further configured to apply the UL/DL allocation change in a next TDD UL/DL reconfiguration window boundary.

BRIEF DESCRIPTION OF THE DRAWINGS

For a detailed description of exemplary embodiments of the invention, reference will now be made to the accompanying drawings in which:

FIG. 4 shows a table of TDD UL/DL configurations for a radio frame in accordance with various embodiments;

FIG. 5 shows a table of Radio Network Temporary Identifier (RNTI) values in accordance with various embodiments;

FIG. 6 shows a timing diagram of a TDD UL/DL reconfiguration method in accordance with various embodiments;

FIG. 7 shows a timing diagram of another TDD UL/DL reconfiguration method in accordance with various embodiments;

FIG. 8 shows a table of DCI format 1C payload sizes and DCI format 1A payload sizes for various bandwidths in accordance with various embodiments;

FIG. 9 shows a block diagram of a TDD UL/DL reconfiguration data structure in accordance with various embodiments;

FIG. 10 shows a block diagram of another TDD UL/DL reconfiguration data structure in accordance with various embodiments;

FIG. 11 shows a table of a mapping between serving cells and TDD UL/DL reconfiguration indexes in accordance with various embodiments;

DETAILED DESCRIPTION

Figure 1:
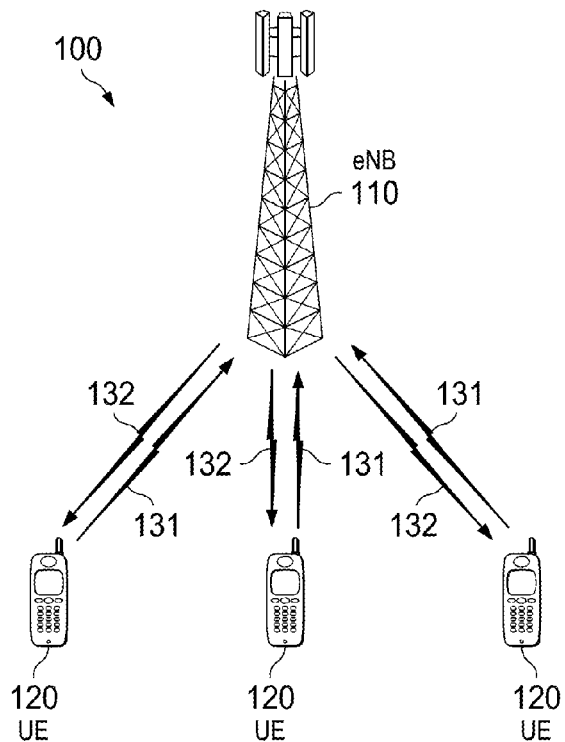
FIG. 1 shows a block diagram of a wireless communication network in accordance with various embodiments.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A TDD wireless communication system may transmit and receive data on a single carrier frequency. UL and DL transmissions may be multiplexed by time slots within a fixed time interval. The ratio between UL and DL transmissions in the fixed time interval may be selected according to UL and DL traffic patterns. In a traditional homogeneous network with macro cell deployments, the UL and DL traffic patterns may be substantially static or semi-static. Thus, a same TDD UL/DL configuration may be employed at least for time intervals of hundreds of milliseconds (ms) or seconds. However, in a heterogeneous network (het-net) with small cell deployments, the UL and DL traffic patterns may be more dynamic in nature. In addition, the proximity of the neighboring small cells may introduce more dynamism into inter-cell interferences, and thus may affect system performance and/or capacity.

Disclosed herein are embodiments of a dynamic signaling scheme for TDD UL/DL reconfiguration in a TDD wireless communication system. The TDD wireless communication system may comprise an eNB communicatively coupled to a plurality of UEs. The TDD wireless communication system may employ a single carrier frequency of moderate or wide bandwidth (e.g. 5, 10, and/or 20 megahertz (MHz)) for both UL and DL transmissions by multiplexing the UL and DL transmissions in a time domain (e.g. in terms of subframes). The TDD wireless communication system may support a plurality of pre-determined TDD UL/DL configurations, which each may comprise a different ratio of the number of UL subframes and the number of DL subframes in a radio frame. The eNB may select a suitable TDD UL/DL configuration according to a TDD UL/DL traffic pattern and may signal a TDD UL/DL reconfiguration to the UEs dynamically. In an embodiment, the eNB may determine a time interval for periodic TDD UL/DL reconfiguration windows or modification windows (e.g. integer multiples of a radio frame) and may transmit at least one TDD UL/DL reconfiguration command in a TDD UL/DL reconfiguration window to signal a TDD UL/DL allocation change (e.g. a TDD UL/DL configuration index), for example, beginning at a next TDD UL/DL reconfiguration window boundary.

The eNB may transmit the TDD UL/DL reconfiguration command via physical layer signaling (e.g. a PDCCH) to provide a fast reconfiguration (e.g. minimal configuration change latency). The eNB may encode and transmit the reconfiguration command in a PDCCH DCI message, which may be located in a PDCCH common search space (CSS) and/or in a PDCCH UE-specific search space (UESS). In an embodiment, when the eNB employ a PDCCH CCS to signal a TDD UL/DL reconfiguration, the eNB may employ a TDD UL/DL reconfiguration specific RNTI (TDD-RNTI) for cyclic redundancy check (CRC) scrambling to differentiate the TDD UL/DL reconfiguration command from other control commands that may be transmitted in the PDCCH CCS.

When the TDD wireless communication system employs carrier aggregation (CA), the eNB may signal the TDD UL/DL reconfiguration for all serving cells to a UE in a PDCCH CCS on a primary serving cell (PCell). For example, the eNB may send a DCI message including UL/DL allocation changes for all serving cells or send a separate DCI message for each serving cell at different reconfiguration schedules. Alternatively, the eNB may signal the TDD UL/DL reconfiguration for a PCell and a secondary serving cell (SCell) separately. For example, the eNB may signal the TDD UL/DL reconfiguration for a PCell in a CCS of a PCell PDCCH and the TDD UL/DL reconfiguration for a SCell in a UESS of a SCell PDCCH.

The eNB may send multiple TDD UL/DL reconfiguration commands in the TDD UL/DL reconfiguration window to improve the reliability of decoding the reconfiguration information at the UE. The disclosed embodiments may enable a TDD wireless communication system to dynamically signal TDD UL/DL allocations to adapt to TDD UL/DL traffic pattern changes, and thus may provide significant increase in system capacity.

FIG. 1 shows a block diagram of a wireless communication network 100 in accordance with various embodiments. The network 100 may provide a variety of communication services, such as voices, packet data, etc. In an embodiment, network 100 may be a 3GPP LTE network or a 3GPP LTE-Advanced network as described in 3GPP LTE specification Release 8 (Rel-8) to Release 11 (Rel-11), which all are incorporated herein by reference. The network 100 may comprise an eNB 110 communicatively coupled to a plurality of UEs 120 via UL channels 131 and DL channels 132.

The eNB 110 may be a wireless communication equipped base station device configured to communicate with the plurality of UEs 120 over the air-interface via the UL channels 131 and the DL channels 132. The eNB 110 may comprise a wireless transceiver or a separate wireless transmitter and receiver with one or more antennas. The eNB 110 may be configured to transmit DL radio signals to one or more UEs 120 and receive UL radio signals from one or more UEs 120.

The UEs 120 may be a wireless communication equipped terminal device configured to communicate with the eNB 110 over air-interface via the UL channels 131 and the DL channels 132. The UEs 120 may be mobile phones, laptops, personal digital assistants (PDAs), or any mobile user equipment. Each UE 120 may comprise a wireless transceiver or a separate wireless transmitter and receiver with one or more antennas and may be configured to transmit UL radio signals to the eNB 110 and receive DL radio signals from the eNB 110.

In some embodiments, network 100 may employ a TDD transmission scheme for UL and DL transmissions in the UL channels 131 and DL channels 132, respectively. Network 100 may multiplex the UL and DL transmissions in the UL channels 131 and DL channels 132, respectively, in a time domain on a single carrier frequency.

In some embodiments, network 100 may employ CA to increase bandwidth, and thereby increase system capacity and/or data transfer bit rate. In such embodiments, the eNB 110 may employ a plurality of component carriers (CCs) to serve a plurality of serving cells. The CCs may or may not be contiguous in frequency and each may comprise a same or a different bandwidth (e.g. 1.4, 3, 5, 10, 15, or 20 MHz). Each CC may operate in a different frequency band and may serve one serving cell, which may be a primary serving cell (PCell) or a secondary serving cell (SCell). For example, the eNB 110 may serve a UE 120 via one PCell (e.g. for establishing radio resource control (RRC) and a connection to a corresponding core network of the network 100) and one or more SCells (e.g. for additional radio resources). The coverage of the serving cells may differ, for example, due to the CCs on different frequency bands experiencing different path loss. In an embodiment, the eNB 110 may send a separate transmission schedule to a UE 120 in each corresponding serving cell. In another embodiment, the eNB 110 may employ a cross-scheduling scheme, where the eNB 110 may send a transmission schedule for the PCell and the SCells on the CC of the PCell. It should be noted that an eNB 110 may configure a UE 120 with CA via an upper layer (e.g. an Open System Interconnection (OSI) layer above a physical layer) configuration command, for example a Media Access Control (MAC) layer command.

In some embodiments, the eNB 110 may be a macro base station installed at a fixed physical location in a planned layout during network deployment to maximize coverage area and system performance (e.g. network capacity). The eNB 110 may serve a pre-determined coverage area, which may be divided into one or more cells (e.g. about three cells). When the network 100 is a homogenous network, network 100 may comprise one or more eNBs 110, each serving one or more macro cells and employing a substantially similar transmit power level, antenna pattern, noise floor, and/or backhaul network connectivity to connect to backend data and/or a packet network. In some other embodiments, the eNB 110 may be a small cell base station (e.g. pico base station, femto base station, etc.) serving a small cell, which may or may not be overlaid with a macro cell. When small cells and macro cells are overlaid, for example, to cover small holes or areas not reached by the macro cells or to boost capacity in hot-spot zones, the network 100 may be referred to as a het-net.

Figure 2:
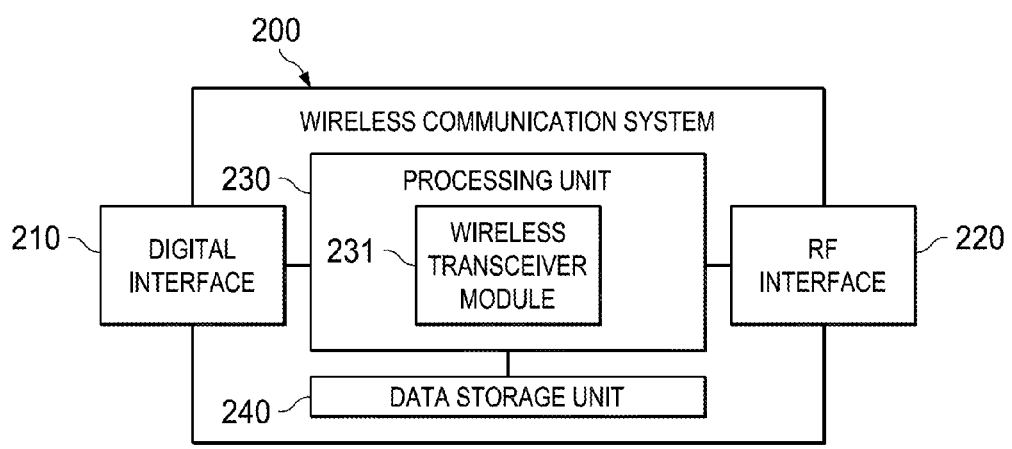
FIG. 2 shows a block diagram of a wireless communication device in accordance with various embodiments.

FIG. 2 shows a block diagram of a wireless communication device 200 in accordance with various embodiments. Device 200 may act as an eNB (e.g. eNB 110), a UE (e.g. UE 120), and/or any other wireless devices in a wireless communication network (e.g. network 100). As shown in FIG. 2, the device 200 may comprise digital interfaces 210, a processing unit 230 (e.g. processing resource), a data storage unit 240, and a RF interface 220. The digital interfaces 210 may be configured to receive digital data streams from external devices and/or transmit digital data streams to external devices. In some embodiments, digital interfaces 210 may include high speed serializer/de-serializer (SerDes) lanes, external memory interfaces (EMIFs), universal serial bus (USB) interfaces, serial peripheral interfaces (SPIs), universal asynchronous receive/transmit (UART) interfaces, Integrated-Integrated Circuit interfaces (I2Cs), general purpose digital Input/Outputs (GPIOs), etc.

A processing unit 230 may be coupled to the digital interface 210 to process the data streams received from the digital interface 210 or generate and transmit data streams to the digital interface 210. The processing unit 230 may comprise one or more processors (e.g., single or multi-core processors, a digital signal processor, etc.), one or more hardware accelerators, one or more computers, and/or data storage unit 240, which may function as data stores, buffers, etc. In some embodiments, the processing unit 230 may include a plurality of hardware accelerators designed specifically for wireless communication. Some examples of hardware accelerators may include Turbo encoding and/or decoding, Viterbi decoding, bit rate processing, Fast Fourier Transform (FFT), packet processing, security processing, etc.

The processing unit 230 may comprise a wireless transceiver module 231 stored in internal non-transitory memory in the processing unit 230 to permit the processing unit 230 to implement a baseband transmit chain, a baseband receiving chain, a downlink control signaling, such as methods 600, 700, 1000, and/or 1100, as discussed more fully below, and/or any other schemes as discussed herein. In an alternative embodiment, the wireless transceiver module 231 may be implemented as instructions stored in the data storage unit 240, which may be executed by the processing unit 230.

The data storage unit 240 may comprise one or more caches (e.g. level one (L1), level two (L2), and/or level three (L3) caches) for temporarily storing content, e.g., a Random Access Memory (RAM). Additionally, the data storage unit 240 may comprise a long-term storage for storing content relatively longer, e.g., a Read Only Memory (ROM). For instance, the cache and the long-term storage may include dynamic random access memories (DRAMs), double data rate 3 (DDR3) RAMs and/or synchronous dynamic random access memories (SDRAMs), solid-state drives (SSDs), hard disks, combinations thereof, or other types of non-transitory storage devices.

The RF interface 220 may be coupled to the processing unit 230 and a radio front end. For example, the radio front end may comprise one or more antennas and may be configured to receive and/or transmit radio signals wirelessly. The RF interface 220 may be configured to receive digital frames generated by the processing unit 230 and transmit the received digital frames to the radio front end. Conversely, the RF interface 220 may be configured to receive digital frames converted by the radio front end (e.g. from received radio signals) and transmit the received digital frames to the processing unit 230 for processing.

Figure 3:
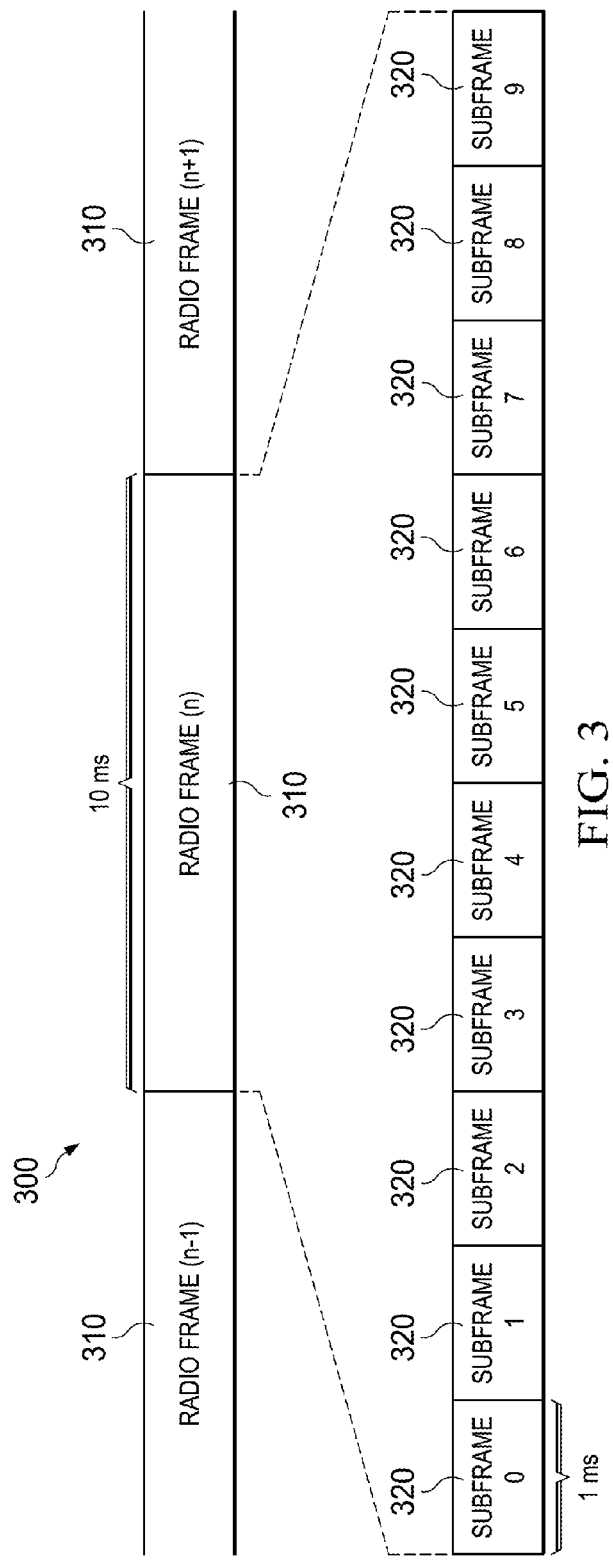
FIG. 3 shows a block diagram of a frame structure for a wireless communication network in accordance with various embodiments.

FIG. 3 shows a block diagram of a frame structure 300 for a wireless communication network, such as network 100, in accordance with various embodiments. The frame structure 300 may be communicated between an eNB (e.g. eNB 110) and one or more UEs (e.g. UEs 120). In frame structure 300, radio transmissions may be defined in terms of radio frames 310. Each radio frame 310 may comprise a plurality of subframes 320 and may span a fixed time interval. For example, in a LTE system, a radio frame 310 may span ten ms and may comprise ten subframes 320, each one ms in time duration.

In an embodiment, the network may employ a TDD transmission scheme for UL and DL transmissions by multiplexing the UL and DL transmissions in time domain on a single frequency. In such an embodiment, each subframe 320 may be configured for UL transmission or DL transmission. For example, a network may employ a fixed number of pre-determined TDD UL/DL configurations, where each TDD UL/DL configuration may comprise a different ratio of the number of UL subframes and the number of DL subframes in a radio frame. For example, an eNB (e.g. eNB 110) may configure UEs (e.g. UE 120) in a cell for a specific TDD UL/DL configuration based on the type of UL and DL traffic in the cell.

In some embodiments, the subframes 320 for DL transmissions and the subframes 320 for UL transmissions may be grouped together and may be separated by a specific subframe 320, which may be referred to as a special subframe. A special subframe may comprise a DL Pilot Time Slot (DwPTS) for DL transmission, a guard period (GP), and a UL Pilot Time Slot (UpPTS) for UL transmission. The GP may enable switching between DL reception and UL transmission at a UE. In addition, the special subframe may enable coexistence with other TDD systems, such as coexistence of the 3GPP LTE system and Time Division-Synchronous Code Division Multiple Access (TD-SCDMA) systems, etc.

In an embodiment, each subframe 320 may comprise a plurality of Orthogonal Frequency Division Multiplexing (OFDM) symbols, which may be about twelve or about fourteen OFDM symbols depending on a cyclic prefix (CP) mode (e.g. extended CP mode or normal CP mode). Each OFDM symbol may span a plurality of OFDM subcarriers, which may be divided into a plurality of resource blocks (RBs). For example, a RB may comprise about twelve OFDM frequency subcarriers. Each DL subframe 320 may comprise a variable downlink control region at the beginning (e.g. from one to four symbols) of the subframe 320 and a variable data region in the remaining symbols for carrying DL data packets from an eNB to a UE. When allocated for UL transmission, subframe 320 may carry UL data packets and/or uplink control signaling from a UE to an eNB.

The downlink control region may be referred to as a PDCCH, which may include a CSS and/or a UESS. A CSS may carry common control information and may be monitored by all UEs or a group of UEs in a cell. The UESS may carry control information specific to a particular UE and may be monitored by at least one UE in a cell. The downlink control region may carry PDCCH data encoded according to some pre-determined downlink control information (DCI) formats, such as DCI formats 1A, 1C, 2D, etc., as described in the 3GPP LTE specifications Rel-8 to Rel-11. The PDCCH data may carry UL scheduling information (e.g. RBs in the data region for a particular UE to send UL data), DL scheduling information (e.g. RBs in the data region for that carries data for a particular UE), RBs in the data region that carries system information messages, paging messages, transmit power control (TPC) commands, etc.

Each type of PDCCH data may be encoded according to one of the pre-determined DCI formats. For example, common or group control information in the PDCCH CSS may be encoded in DCI format 1A or 1C. The common control information may be differentiated by the payload size of the DCI formats and/or a 16-bit RNTI that is employed for scrambling the CRC of the DCI encoded common control information message, where each type of common control information may comprise a different RNTI. For example, a system information-RNTI (SI-RNTI) may be employed for indicating RBs for system information (SI), a paging information-RNTI (P-RNTI) may be employed for indicating RBs for a paging message, a cell-RNTI (C-RNTI) may be employed for indicating RBs for a particular UE, a random access-RNTI (RA-RNTI) may be employed for indicating RBs for a random access response message, etc.

As such, when a UE receives PDCCH data from a PDCCH CSS, the UE may perform blind decoding to detect the correct payload size. For example, the UE may perform one set of blind decoding operations to detect DCI format 1A and another set of blind decoding operations to detect DCI format 1C. After detecting the correct DCI format, the UE may determine the type of control information by correctly scrambling the CRC in the received PDCCH data with a RNTI corresponding to the common control information type.

In some embodiments, the downlink control region may include an additional region spanning a plurality of frequency subcarriers across the data region, for example, as described in the 3GPP LTE specification Release 11 (Rel-11), that carries additional downlink control signals. The additional downlink control region may be referred to as the enhanced PDCCH (EPDCCH) in the 3GPP LTE specification Rel-11. It should be noted that in the present disclosure, the term PDCCH may be employed to refer to downlink control region in general and may include the 3GPP LTE PDCCH, the 3GPP LTE EPDCCH, or combinations thereof.

FIG. 4 shows a table 400 of TDD UL/DL configurations for a radio frame, such as radio frame 310, in accordance with various embodiments. In Table 400, column 410 shows indexes for a plurality of TDD UL/DL configurations and column 430 shows the TDD UL/DL configurations, which each may comprise about ten subframes (e.g. subframe 320). In column 430, a subframe allocated for UL transmission is denoted by "U", a subframe allocated for DL transmission is denoted by "D", and a subframe allocated for switching from DL to UL is denoted by "S". The time at which the DL transmission is switched to the UL transmission or the time at which the UL transmission is switched to the DL transmission may be referred to as a switch-point. A switch-point periodicity may represent a period in which the same switching pattern is repeated between UL and DL. The switch-point for the TDD UL/DL configurations illustrated in Table 400 may comprise a switch-point periodicity of about 5 ms or about 10 ms as shown in column 420. It should be noted that each TDD UL/DL configuration in column 430 may comprise a different UL-to-DL ratio (e.g. to provision for different UL/DL traffic patterns). In addition, the transmission directions for subframes 0, 1, 2, and 5 (e.g. shown as shaded in Table 400) may be fixed for all TDD UL/DL configurations, while the transmission directions for subframes 3, 4, 6, 7, 8, and 9 (e.g. shown as unshaded in Table 400) may be variable, in which any two TDD UL/DL configurations may have different transmission directions.

FIG. 5 shows a table 500 of RNTI values in accordance with various embodiments. For example, the RNTI values may be employed for scrambling the CRC of a DCI message transmitted on the PDCCH, where each RNTI value may correspond to a downlink control type. As shown in Table 500, the range of RNTI values from 0001 to 003C hexadecimal format may be employed for indicating RBs in a data region of a subframe that carry a random access response message (e.g. RA-RNTI), a UE specific message (e.g. C-RNTI), a semi-persistent scheduling message for a particular UE (e.g. semi-persistent scheduling C-RNTI), a random access message (e.g. temporary C-RNTI) during a random access procedure, a TPC command for a physical uplink control channel (PUCCH) (e.g. TPC-PUCCH-RNTI), a TPC command for a physical uplink shared channel (PUSCH) (e.g. TPC-PUSCH-RNTI), etc.

The range of RNTI values from 003D to FFF3 in hexadecimal format may be employed for indicating RBs in a data region of a subframe that carries a UE specific message (e.g. C-RNTI), a semi-persistent schedule message for a particular UE (e.g. semi-persistent scheduling C-RNTI), a random access message during a random access procedure (e.g. temporary C-RNTI), a TPC command for PUCCH (e.g. TPC-PUCCH-RNTI), a TPC command for a PUSCH (e.g. TPC-PUSCH-RNTI), etc.

The range of RNTI values from FFF4 to FFFC in hexadecimal format may be reserved. The RNTI values FFFD, FFFE, and FFFF may be employed for indicating RBs in a data region of a subframe for multicast control information (e.g. Multicast-RNTI (M-RNTI)), a paging message (e.g. P-RNTI), and system information (e.g. SI-RNTI), respectively.

In an embodiment, TDD UL/DL data traffic patterns in a homogeneous network may be substantially static and may remain unchanged at least for time intervals of hundreds of ms to seconds. As such, an eNB (e.g. eNB 110) in a homogenous network may select a suitable TDD UL/DL configuration (e.g. as shown in Table 400) according to a UL/DL traffic pattern and may not modify and/or reconfigure the TDD UL/DL configuration frequently. Thus, a homogenous network may allow some reconfiguration latency without substantial performance impact, in which the eNB may send a TDD UL/DL reconfiguration via a MAC layer message (e.g. a system information (SI) message). Conversely, TDD UL/DL data traffic patterns or interference profiles in a het-net may be dynamic (e.g. fast changes) in nature, and thus a fast TDD UL/DL reconfiguration with minimal latency may provide significant improvements in system capacity.

In a het-net, the proximity of neighboring small cells may introduce more dynamics into inter-cell interference. For example, the employment of different TDD UL/DL configurations across the neighboring cells may lead to two additional types of interferences, DL-UL interferences and UL-DL interferences, when compared to a homogeneous network. The DL-UL interferences may refer to interferences at a UE (e.g. UE 120) caused by DL transmissions from an eNB (e.g. eNB 110) at a neighboring cell. The UL-DL interferences may refer to interferences at an eNB caused by UL transmissions from UEs in a neighboring cell.

As described in Table 400 herein above, the transmission direction in some subframes (e.g. subframes 0, 1, 2, and 5 in Table 400) may be fixed for all TDD UL/DL configurations and may be referred to as fixed subframes. Conversely, other subframes (e.g. subframes 3, 6, 6, 7, 8, and 9 in Table 400) may comprise different transmission directions between any two TDD UL/DL configurations and may be referred to as flexible subframes. As such, eNBs (e.g. eNB 110) and/or UEs (e.g. UEs 120) in neighboring cells may not experience UL-DL or DL-UL inter-cell interferences in the fixed subframes, but may experience UD-DL and/or DL-UL inter-cell interferences in the flexible subframes.

FIG. 6 shows a timing diagram of a TDD UL/DL reconfiguration method 600 in accordance with various embodiments. The method 600 may be implemented at an eNB (e.g. eNB 110), a UE (e.g. UE 120), and/or a wireless communication device (e.g. device 200). The method 600 may employ a physical layer signaling mechanism to signal a TDD UL/DL reconfiguration. The employment of physical layer signaling instead of MAC layer signaling may provide a faster TDD UL/DL reconfiguration and/or minimal latency. In an embodiment, a TDD UL/DL reconfiguration may be signaled via PDCCH common signaling (e.g. in a PDCCH CCS of a subframe 320) and the TDD UL/DL reconfiguration may be applied to a future radio frame (e.g. radio frame 310). It should be noted that an eNB may configure a UE for dynamic TDD UL/DL reconfiguration (e.g. an enabling command) prior to employing method 600 to signal a TDD UL/DL allocation dynamically.

Method 600 may define a time interval for periodic reconfiguration windows m, m+1, m+2 630, which may be multiple integers of radio frame (e.g. radio frame 310). For example, method 600 may send a first TDD UL/DL reconfiguration command 610 comprising a first TDD UL/DL configuration (e.g. as shown in Table 400) in reconfiguration window m 630 at time 621 and the first TDD UL/DL configuration may begin at the boundary of the next reconfiguration window m+1 630 at time 622 and remain for the duration of the reconfiguration window m+1 630. Similarly, method 600 may send a second TDD UL/DL reconfiguration command 610 comprising a second TDD UL/DL configuration in reconfiguration window m+1 630 at time 623 and the second TDD UL/DL configuration may begin at the boundary of the next reconfiguration window m+2 630 at time 624 and remain for the duration of the reconfiguration window m+2 630. It should be noted that when the TDD UL/DL reconfiguration command is signaled via PDCCH common signaling, hybrid automatic repeat request (HARQ) may not be applied, in which an eNB may not receive a HARQ acknowledgment feedback regarding the reception status of the TDD UL/DL reconfiguration command.

FIG. 7 shows a timing diagram of another TDD UL/DL reconfiguration method 700 in accordance with various embodiments. Method 700 may be substantially similar to method 600. However, method 700 may improve transmission reliability by sending a same TDD UL/DL reconfiguration command 710 repeatedly in a reconfiguration window 730, where the TDD UL/DL reconfiguration commands 710 and the reconfiguration windows 730 may be substantially similar to TDD UL/DL reconfiguration command 610 and reconfiguration window 630, respectively. It should be noted that the reconfiguration windows 630 and/or 730 may comprise a time interval of one or more radio frames. In addition, the latency between the time when the TDD UL/DL reconfiguration commands 610 and/or 710 is detected at a UE and the time when the reconfiguration is applied may be determined by an eNB (e.g. eNB 110) according to various network factors (e.g. network conditions, deployment scenarios, etc.)

In an embodiment, an eNB (e.g. 110) may transmit a TDD UL/DL reconfiguration command (e.g. command 610 and/or 710) via a PDCCH to provide a fast reconfiguration (e.g. minimal configuration change latency). The eNB may encode the reconfiguration command in a physical layer DCI message, which may be located in a PDCCH CSS and/or a PDCCH UESS. In an embodiment, the eNB defines a TDD-RNTI and may indicate a PDCCH CCS DCI message carrying a TDD UL/DL reconfiguration by scrambling the CRC of the DCI message by the TDD-RNTI.

In an embodiment, the TDD UL/DL reconfiguration commands (e.g. commands 610 and/or 710) may be indicated in terms of configuration index. For example, a 3-bit data field may be employed to indicate up to about seven different TDD UL/DL configurations (e.g. as shown in Table 400). The TDD UL/DL reconfiguration commands may be signaled via a PDCCH to provide a fast TDD UL/DL reconfiguration, where the TDD UL/DL reconfiguration command may be encoded according to DCI format 1A or 1C.

FIG. 8 shows a table 800 of DCI format 1C payload sizes and DCI format 1A payload sizes for various bandwidths in accordance with various embodiments. As shown in Table 800, DCI format 1C may comprise a payload size of about eight bits to about fifteen bits and DCI format 1A may comprise a payload size of about twenty three bits to about thirty one bits as the system bandwidth varies between six RBs (e.g. at 1.4 MHz) to one hundred RBs (e.g. at 20 MHz). As shown in Table 800, DCI format 1C may comprise a smaller payload size than DCI format 1A. As such, DCI format 1C payload may provide better transmission and/or reception reliability since a smaller payload size may be encoded with a lower coding rate for the same amount of transmission resources, and thus may provide a higher protection against channel errors. For example, when the payload size of a DCI format 1C at a system operating bandwidth is sufficient to carry required TDD UL/DL reconfiguration commands, the TDD UL/DL reconfiguration commands may be encoded in a payload size matching DCI format 1C. Otherwise, a payload size matching DCI format 1A may be employed for encoding the TDD UL/DL reconfiguration commands.

When the TDD UL/DL reconfiguration commands are indicated via PDCCH CCS, a unique TDD-RNTI may be employed for scrambling the CRC of the control information when the DCI payload size is matched to DCI format 1A or the DCI format 1C in order to differentiate the TDD UL/DL reconfiguration commands from other control messages (e.g. SI, paging, etc.) in the PDCCH CCS. For example, the TDD-RNTI may comprise one of the reserved RNTI values (e.g. FFF4 to FFFC in hexadecimal format) as shown in Table 500 described herein above. Alternatively, the TDD-RNTI may be selected from some other range of values in Table 500 (e.g. 0001-003C). In order to reduce false detection of TDD UL/DL reconfigurations, the TDD UL/DL reconfiguration command may be transmitted with different schedules (e.g. radio frame periodicity and/or subframe offsets with respect to a radio frame). The reconfiguration command is only transmitted in fixed DL subframes, e.g. subframes 0 and 5. In 3GPP LTE, SI messages may be transmitted in non-overlapping SI windows, where the SI messages may be transmitted in any DL subframe except multicast broadcast single frequency network (MBSFN) subframes and subframes carrying system information block type 1 (SIB1) (e.g. subframe 5 of radio frames with subframe number (SFN) modulo 2=0). By defining suitable SI windows and SI periodicities, the eNB may ensure that TDD UL/DL reconfiguration commands indicated by the TDD-RNTI may not collide with the SI messages indicated by SI-RNTI. For example, SI window lengths may be in the range of {1, 2, 5, 10, 15, 20, 40} ms. Thus, collision probability may be further reduced by configuring the TDD UL/DL reconfiguration window (e.g. reconfiguration windows 630 and/or 730) to be at least about 20 ms. It should be noted that similar mechanisms may be applied between the TDD reconfiguration windows and other control information change windows, such as paging, multicast control channel (MCCH) change, etc.

FIG. 9 shows a block diagram of a TDD UL/DL reconfiguration data structure 900 in accordance with various embodiments. In an embodiment, an eNB (e.g. eNB 110) may serve a UE (e.g. UE 120) via one PCell and up to about four SCells. The eNB may indicate a TDD UL/DL reconfiguration to the UE by employing data structure 900, for example, by sending a DCI payload comprising the data structure 900 in a PDCCH CCS on the PCell. The data structure 900 may comprise a PCell field 910, a SCell Index 1 field 920, a SCell Index 2 field 930, a SCell Index 3 field 940, and a SCell Index 4 field 950. The PCell field 910 may indicate a TDD UL/DL configuration for a PCell via a configuration index (e.g. as shown in column 410 of Table 400) and may comprise a length of about three bits (e.g. corresponding to about seven pre-determined TDD UL/DL configurations). Similarly, the SCell Index 1 field 920, the SCell Index 2 field 930, the SCell Index 3 field 940, and the SCell Index 4 field 950 may indicate a TDD UL/DL configuration index for a first SCell, a second SCell, a third SCell, and a fourth SCell, respectively, where each configuration index may correspond to one of the pre-determined TDD UL/DL configurations.

FIG. 10 shows a block diagram of another TDD UL/DL reconfiguration data structure 1000 in accordance with various embodiments. The data structure 1000 may be employed by an eNB (e.g. eNB 110) to indicate a TDD UL/DL reconfiguration to a UE (e.g. UE 120). The data structure 1000 may be substantially similar to data structure 900. However, data structure 1000 may indicate a TDD UL/DL reconfiguration for a plurality of CCs transmitted by an eNB (e.g. serving a plurality of serving cells) instead of specific SCells for a particular UE as in data structure 900. The data structure 1000 may comprise a plurality of reconfiguration (Reconfig) fields 1010 (e.g. Reconfig 1 to N). Each Reconfig field 1010 may indicate a TDD UL/DL configuration for a particular serving cell via a configuration index (e.g. as shown in column 410 of Table 400) and may comprise a length of about three bits. The number (e.g. N) of Reconfig fields 1010 may vary according to the number of CCs employed (or serving cells controlled) by the eNB. For example, the eNB may assign one or more Reconfig fields 1010 to a UE (e.g. corresponding to configured serving cells) for indicating a TDD UL/DL reconfiguration. It should be noted that the data structure 1000 may further comprise a padding field 1020 with a padding length corresponding to a number of bits remaining in a particular DCI format size (e.g. DCI format 1A or 1C) after assigning all the N Reconfig fields 1010 of fixed bit-width.

FIG. 11 shows a table 1100 of a mapping between serving cells and TDD UL/DL reconfiguration indexes in accordance with various embodiments. For example, an eNB (e.g. eNB 110) may serve a plurality of UEs (e.g. UEs 120) via a plurality of CCs. As shown in Table 1100, the eNB may serve a UE 1 on a PCell via CC1, and thus the eNB may assign Reconfig 1 (e.g. Reconfig field 1010) to UE1 via RRC signaling and may indicate on the PDCCH CCS a TDD UL/DL reconfiguration for the PCell with CC1 via Reconfig 1. The eNB may serve a UE2 on a PCell via CC1 and a SCell via CC 3. Thus, the eNB may assign Reconfig 1 and Reconfig 3 (e.g. Reconfig field 1010) to UE2 via RRC signaling and may indicate TDD UL/DL reconfigurations on the PDCCH CCS for the PCell with CC1 and the SCell with CC3 via Reconfig 1 and Reconfig 3, respectively. The eNB may serve a UE3 on a PCell via CC1, a SCell1 via CC2, and a SCell2 via CC4. Thus, the eNB may assign Reconfig 1, 2, and 4 to UE3 via RRC signaling and may indicate TDD UL/DL reconfigurations on the PDCCH CCS for the PCell, the SCell1, and the SCell2 via Reconfig 1, 2, and 4, respectively.

Figure 12:
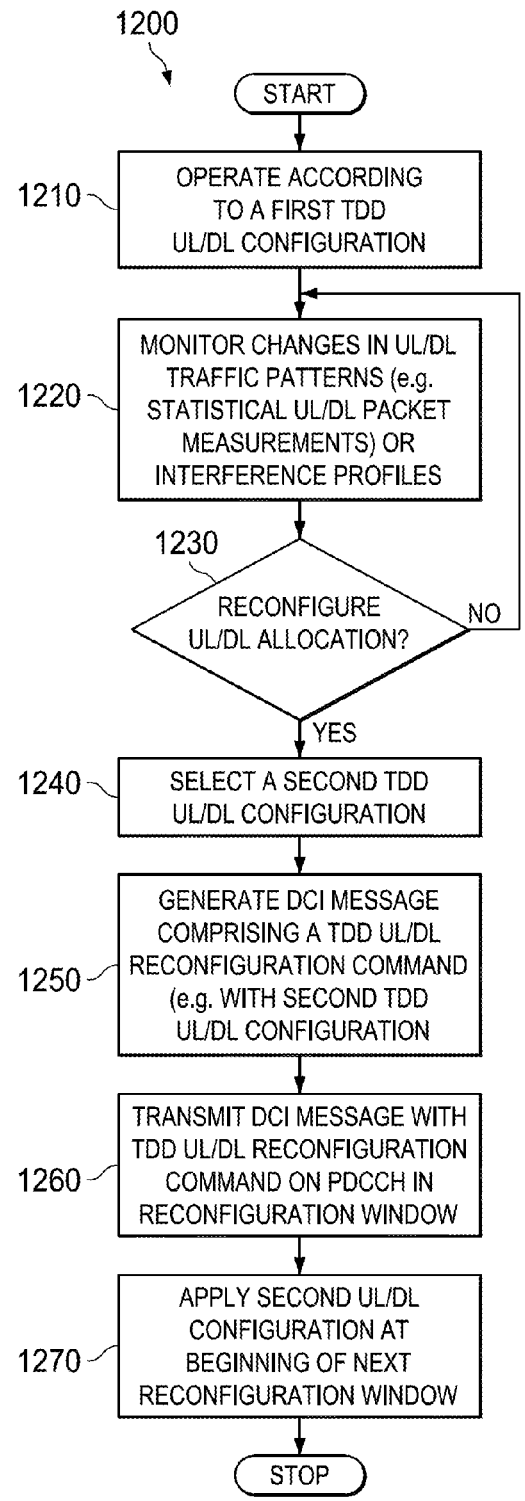
FIG. 12 shows a flowchart of a method for signaling a TDD UL/DL reconfiguration dynamically in accordance with various embodiments.

FIG. 12 shows a flowchart of a method 1200 for signaling a TDD UL/DL reconfiguration dynamically in accordance with various embodiments. Method 1200 may be implemented on an eNB, such as eNB 110, and/or a wireless communication device, such as device 200, and may be substantially similar to methods 600 and/or 700 as described herein above. Method 1200 may begin with a set of pre-determined TDD UL/DL configurations (e.g. as shown in Table 400) and one or more pre-determined TDD UL/DL reconfiguration windows (e.g. reconfiguration windows 630 and/or 730). For example, the reconfiguration windows may span a time interval of at least one radio frame (e.g. radio frames 310) and may be periodic.

At step 1210, method 1200 may operate according to a first TDD UL/DL configuration (e.g. pre-configured by RRC signaling). At step 1220, method 1200 may monitor changes in UL/DL traffic patterns (e.g. tracking some statistical UL/DL packet measurements). At step 1230, method 1200 may determine whether to reconfigure UL/DL allocation. For example, method 1200 may determine to reconfigure the UL/DL allocation at step 1230 when the UL/DL traffic pattern changes by a substantial amount and a UL/DL re-allocation may increase system capacity. If method 1200 determines to reconfigure the UL/DL allocation, method 1200 may proceed to step 1240. Otherwise, method 1200 may return to step 1220. At step 1240, method 1200 may select a second TDD UL/DL configuration from the set of pre-determined TDD UL/DL configurations according to a UL/DL traffic pattern (e.g. most recent).

At step 1250, method 1200 may generate a DCI message comprising a TDD UL/DL reconfiguration command. For example, the TDD UL/DL reconfiguration command may provide the second TDD UL/DL configuration. Methods 1300, 1400, 1500, and/or 1600 may describe various mechanisms for generating the DCI message more fully below. After generating the DCI message, at step 1260, method 1200 may transmit the DCI message comprising the TDD UL/DL reconfiguration command in a pre-determined reconfiguration window.

At step 1270, method 1200 may apply the second TDD UL/DL configuration at the beginning or boundary of a next TDD UL/DL reconfiguration window, where the boundary may correspond to the beginning of a radio frame. It should be noted that method 1200 may repeat the sending (e.g. according to some pre-determined notification periodicity) of the TDD UL/DL reconfiguration command at step 1260 within a reconfiguration window, for example, as shown in method 800, to improve reception reliability of the TDD UL/DL reconfiguration command at a UE.

Figure 13:
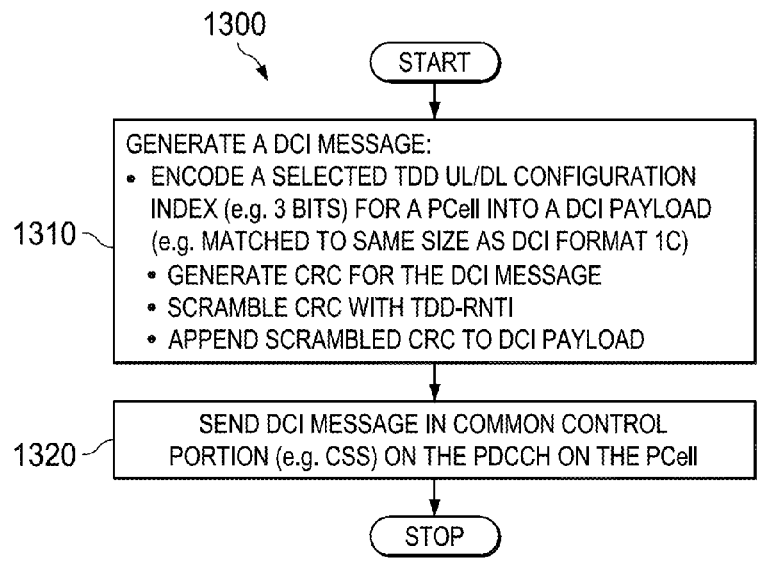
FIG. 13 shows a flowchart of another method for signaling a TDD UL/DL reconfiguration dynamically in accordance with various embodiments.

FIG. 13 shows a flowchart of another method 1300 for signaling a TDD UL/DL reconfiguration dynamically in accordance with various embodiments. Method 1300 may be implemented on an eNB, such as eNB 110, and/or a wireless communication device, such as device 200. An eNB may employ method 1300 to signal a TDD UL/DL reconfiguration for a PCell to a UE (e.g. UE 120) when serving the UE with or without CA. Method 1300 may begin after determining a TDD UL/DL reconfiguration and selecting a TDD UL/DL configuration for a next TDD UL/DL reconfiguration window.

At step 1310, method 1300 may generate a DCI message comprising the selected TDD UL/DL configuration. For example, method 1300 may encode the selected TDD UL/DL configuration (e.g. a 3-bit field representing a configuration index as shown in column 410 of Table 400) into a DCI message with a payload size matching a payload size of a pre-determined DCI format (e.g. DCI format 1C). After encoding the selected TDD UL/DL configuration into a DCI message, method 1300 may generate a CRC for the DCI message, scramble the CRC with a TDD UL/DL configuration specific RNTI (e.g. TDD-RNTI) value, and append the scrambled CRC to the DCI message.

After generating the DCI message, method 1300 may send the DCI message in a common control portion (e.g. CCS) of a PDCCH on the PCell at step 1320. It should be noted that the common control portion of the PDCCH may carry physical layer controls common to all UEs and each type of common control may be differentiated by a unique RNTI value.

Figure 14:
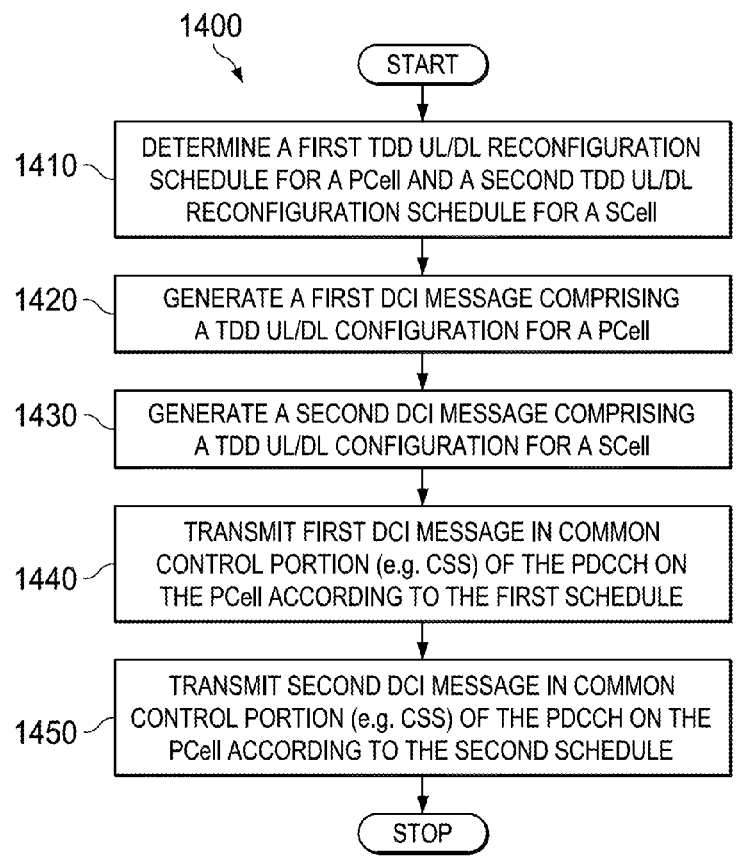
FIG. 14 shows a flowchart of another method for signaling a TDD UL/DL reconfiguration dynamically in accordance with various embodiments.

FIG. 14 shows a flowchart of another method 1400 for signaling a TDD UL/DL reconfiguration dynamically in accordance with various embodiments. Method 1400 may be implemented on an eNB, such as eNB 110, and/or a wireless communication device, such as device 200. Method 1400 may be employed for signaling TDD UL/DL reconfigurations for a plurality of serving cells to a UE (e.g. UE 120) when serving the UE on the plurality of service cells, for example, a PCell served on a first CC and a SCell served on a second CC. Method 1400 may begin after determining a TDD UL/DL reconfiguration and selecting a TDD UL/DL configuration for each serving cell for a next TDD UL/DL reconfiguration window.

At step 1410, method 1400 may determine a first TDD UL/DL reconfiguration schedule for the PCell and a second TDD UL/DL reconfiguration schedule for the SCell. For example, the first reconfiguration schedule and the second reconfiguration schedule may comprise different periodicities, different subframe offsets with respect to a beginning of a radio frame, or combinations thereof.

At step 1420, method 1400 may generate a first DCI message comprising the selected TDD UL/DL configuration for the PCell. At step 1430, method 1400 may generate a second DCI message comprising the selected TDD UL/DL configuration for the SCell. For example, method 1400 may employ substantially similar mechanisms as in step 1310 to generate the first DCI message and the second DCI message.

At step 1440, method 1400 may transmit the first DCI message in a common control portion or the CCS of a PDCCH on the PCell according to the first schedule. At step 1450, method 1400 may transmit the second DCI message in the common control portion of the PDCCH on the PCell according to the second schedule. It should be noted that method 1400 may be suitable for dynamically signaling TDD UL/DL reconfigurations for one or more SCells, for example, by employing a different TDD UL/DL reconfiguration schedule for each serving cell and transmitting a DCI message comprising a corresponding TDD UL/DL configuration according to a corresponding schedule.

Figure 15:
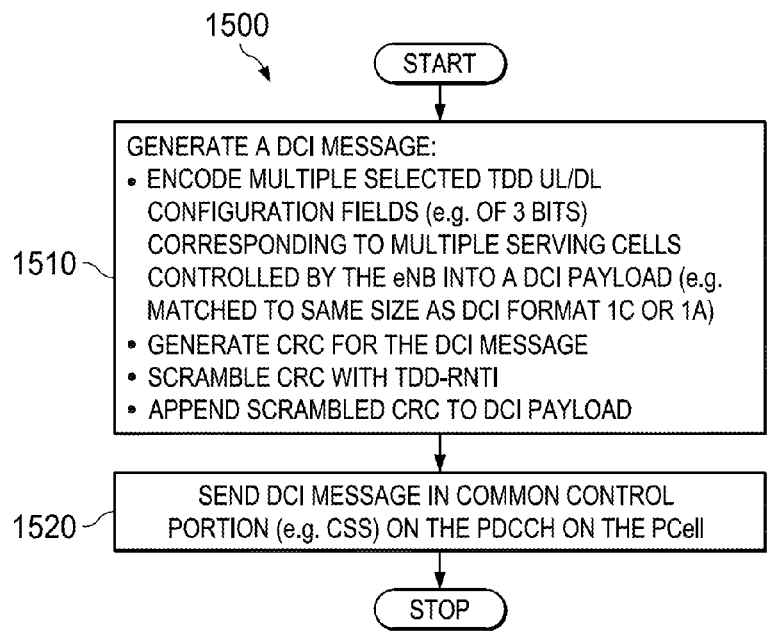
FIG. 15 shows a flowchart of another method for signaling a TDD UL/DL reconfiguration dynamically in accordance with various embodiments.

FIG. 15 shows a flowchart of another method 1500 for signaling a TDD UL/DL reconfiguration dynamically in accordance with various embodiments. Method 1500 may be implemented on an eNB, such as eNB 110, and/or a wireless communication device, such as device 200. Method 1500 may be employed for signaling TDD UL/DL reconfigurations for a plurality of serving cells to a UE (e.g. UE 120) when serving the UE on the plurality of serving cells, for example, a PCell served on a first CC and a SCell served on a second CC. Method 1500 may be referred to as a cross scheduling method, where TDD UL/DL reconfigurations for all serving cells may be sent on a PCell. Method 1500 may also be used to signal TDD UL/DL reconfigurations to a plurality of serving cells controlled by an eNB, where subsets of the plurality of serving cells may be configured for two or more UEs connected to the eNB. Method 1500 may begin after determining a TDD UL/DL reconfiguration and selecting a TDD UL/DL configuration for each serving cell for a next TDD UL/DL reconfiguration window.

At step 1510, method 1500 may generate a DCI message comprising the selected TDD UL/DL configuration for multiple serving cells controlled by the eNB. Method 1500 may employ substantially similar mechanisms as in step 1310 of method 1300 to generate the DCI message, but may encode the selected TDD UL/DL configuration indexes for the multiple serving cells into a single DCI message. For example, method 1500 may encode the selected TDD UL/DL configuration into a DCI message with a same payload size as DCI format 1C or 1A, where each of the TDD UL/DL configurations may be represented by a 3-bit field (e.g. configuration index as shown in column 410 of Table 400). After generating the DCI message, method 1500 may generate a CRC for the DCI message, scramble the CRC with a TDD-RNTI value, and append the scrambled CRC to the DCI message. It should be noted that the DCI message may comprise a data structure substantially similar to data structure 900 (e.g. referencing the configurations according to serving cell indexes of a UE) or 1000 (e.g. referencing the configurations according to CC or serving cell indexes controlled by the eNB).

At step 1520, after generating the DCI message, method 1500 may transmit the DCI message in a common control portion (e.g. CCS) of a PDCCH on the PCell. It should be noted that the common control portion of the PDCCH may carry physical layer controls common to all UEs and each type of common control may be differentiated by a unique RNTI value.

Figure 16:
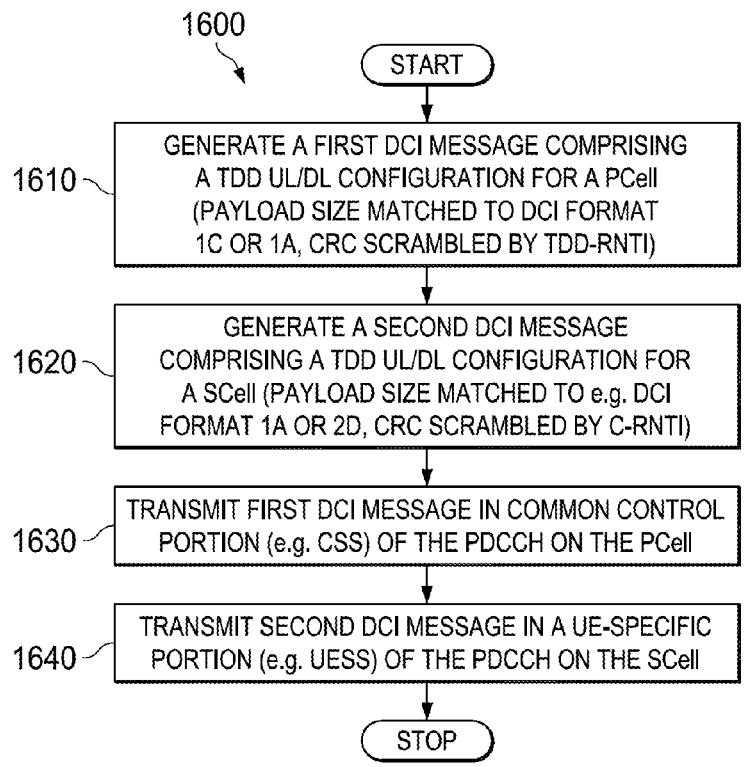
FIG. 16 shows a flowchart of another method for signaling a TDD UL/DL reconfiguration dynamically in accordance with various embodiments.

FIG. 16 shows a flowchart of another method 1600 for signaling a TDD UL/DL reconfiguration dynamically in accordance with various embodiments. Method 1600 may be implemented on an eNB, such as eNB 110, and/or a wireless communication device, such as device 200. Method 1600 may be employed for signaling TDD UL/DL reconfigurations for a plurality of serving cells to a UE (e.g. UE 120) when serving the UE on the plurality of service cells, for example, a PCell served on a first CC and a SCell served on a second CC. Method 1600 may be referred to as a hybrid signaling method, where a PCell TDD UL/DL reconfiguration may be sent on PCell via common physical layer signaling and a SCell TDD UL/DL reconfiguration may be sent on a SCell via dedicated physical layer signaling. Method 1600 may begin after determining a TDD UL/DL reconfiguration and selecting a TDD UL/DL configuration for each serving cell for a next TDD UL/DL reconfiguration window.

At step 1610, method 1600 may generate a first DCI message comprising the selected TDD UL/DL configuration for the PCell. For example, method 1600 may employ substantially similar mechanisms as in step 1310 of method 1300 to generate the first DCI message, where a TDD-RNTI may be employed for CRC scrambling and a DCI format 1A or 1C may be employed for DCI encoding.

At step 1620, method 1600 may generate a second DCI message comprising the selected TDD UL/DL configuration for the SCell. For example, method 1600 may employ substantially similar mechanisms as in step 1310 of method 1300 to generate the second DCI message, but may employ a UE specific RNTI (e.g. C-RNTI) for CRC scrambling and a DCI format 1A or 2D for DCI encoding.

At step 1630, method 1600 may transmit the first DCI message in a common control portion (e.g. CSS) of a PDCCH on the PCell. At step 1640, method 1600 may transmit the second DCI message in a UE specific control portion (e.g. UESS) of the PDCCH on the SCell. Alternatively, method 1600 may transmit the second DCI message in a UE specific control portion of the PDCCH on the PCell. It should be noted that TDD UL/DL reconfiguration schedules for the PCell and the SCell may or may not be the same.

Figure 17:
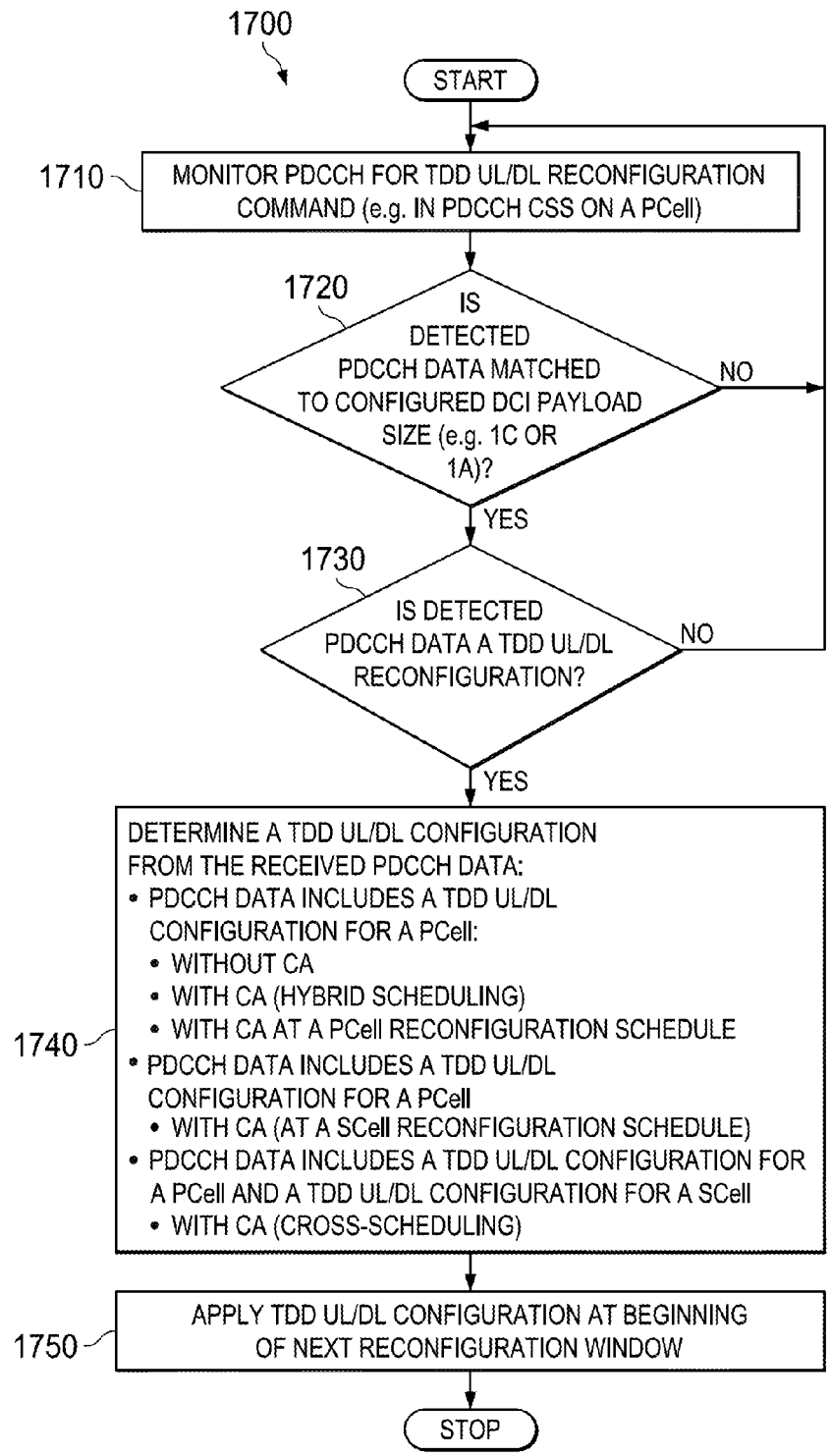
FIG. 17 shows a flowchart of a method for detecting a TDD UL/DL reconfiguration dynamically in accordance with various embodiments.

FIG. 17 shows a flowchart of a method 1700 for detecting a TDD UL/DL reconfiguration dynamically in accordance with various embodiments. Method 1700 may be implemented on a UE, such as UE 120, and/or a wireless communication device, such as device 200, and may be substantially similar to methods 600 and/or 700 as described herein above. Method 1700 may begin with a set of configuration parameters, for example, received from an eNB (e.g. eNB 110) via RRC signaling during an initialization phase. The set of configuration parameters may include a reconfiguration window (e.g. subframe offset in a radio frame and/or period), the payload size of a DCI message that carries a TDD UL/DL reconfiguration command, a TDD UL/DL reconfiguration window size, a TDD UL/DL reconfiguration specific RNTI, a dynamic TDD UL/DL reconfiguration enabling command, and/or a CA enabling command. The dynamic TDD UL/DL reconfiguration enabling command may be signaled per serving cell for a UE.

At step 1710, method 1700 may monitor PDCCH for a transmitted PDCCH data containing an UL/DL reconfiguration command. For example, method 1700 may monitor a PDCCH CSS on a PCell. Upon receiving a PDCCH data, method 1700 may determine whether the received PDCCH data payload is matched to the configured size (e.g. to DCI format 1A or 1C for PDCCH CSS) at step 1720. For example, method 1700 may perform one set of blind decoding to detect DCI format 1A and another set of blind decoding to detect DCI format 1C (e.g. differentiated by payload size). When method 1700 determines that the PDCCH data payload size matches the configured payload size (e.g. either size of DCI format 1A or 1C), method 1700 may proceed to step 1730. Otherwise, method 1300 may return to step 1710.

At step 1730, after determining that the DCI payload size matches the configured size, method 1700 may determine whether the PDCCH data carries a TDD UL/DL reconfiguration command. For example, method 1700 may descramble the CRC of the PDCCH data by a TDD UL/DL reconfiguration specific RNTI (e.g. TDD-RNTI). When the descrambled CRC is correct (e.g. matches the CRC computed for the received PDCCH data), method 1700 may determine that the PDCCH data carries a TDD UL/DL reconfiguration command. When the PDCCH data carries a TDD UL/DL reconfiguration command, method 1700 may proceed to step 1740. Otherwise, method 1700 may return to step 1710. It should be noted that method 1700 may additionally check that the PDCCH data is received at a schedule corresponding to a TDD UL/DL reconfiguration schedule.

At step 1740, method 1700 may determine a TDD UL/DL configuration from the received PDCCH data. The received PDCCH data may comprise one or more TDD UL/DL configuration indexes. The location of a UL/DL reconfiguration field within the DCI payload for a serving cell is pre-configured by RRC signaling. In an embodiment, the received PDCCH data may comprise a TDD UL/DL reconfiguration command comprising a 3-bit field that indicates a TDD UL/DL configuration (e.g. as shown in Column 410 of Table 400) for a PCell, for example, when a UE is served by a PCell only (e.g. without CA). Alternatively, multiple 3-bit fields may indicate the TDD UL/DL configurations for the PCell and one or more SCells (e.g. with CA and hybrid scheduling).

It should be noted that method 1700 may also determine the schedule at which the PDCCH data is received, for example, when the PDCCH data is received at a PCell TDD UL/DL reconfiguration schedule, the PDCCH data may comprise a TDD UL/DL configuration for a PCell. Conversely, when the PDCCH data is received at a SCell TDD UL/DL reconfiguration schedule, the PDCCH data may comprise a TDD UL/DL configuration for a corresponding SCell. In some embodiments, the PCell TDD UL/DL reconfiguration schedule and the SCell TDD UL/DL reconfiguration schedule may comprise different periodicities, different subframe offsets with respect to a beginning of a radio frame, or combinations thereof.

In an embodiment of CA with a cross scheduling scheme, the received PDCCH data may comprise TDD UL/DL configurations for a plurality of serving cells. For example, the TDD UL/DL reconfiguration command may comprise a data structure substantially similar to data structure 900 or 1000 that indicates a TDD UL/DL configuration for each serving cell.

It should be noted that in some embodiments, method 1700 may receive multiple TDD UL/DL reconfiguration commands within a reconfiguration window (e.g. reconfiguration windows 630 and/or 730), and thus may improve reliability in the reception of the TDD UL/DL reconfiguration commands.

At step 1750, after determining the TDD UL/DL configurations from the TDD UL/DL reconfiguration command, method 1700 may apply the TDD UL/DL configurations at the beginning or boundary of a next reconfiguration window (e.g. in a serving corresponding cell), where the boundary may correspond to the beginning of a radio frame.

It should be noted that a UE may employ method 1700 when communicating with an eNB on a SCell (e.g. dedicated signaling). However, method 1700 may monitor the PDCCH UESS on the SCell instead of a PDCCH CSS on a PCell as shown in step 1710 and may check for DCI format 1A or 2D instead of DCI format 1A or 1C as shown in step 1720. In addition, at step 1740, method 1700 may receive a TDD UL/DL configuration for the SCell instead of a TDD UL/DL configuration for a PCell.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus for use in a wireless communication network, comprising:
   a processor configured to:
      determine a time interval for periodic time division duplex (TDD) Uplink/Downlink (UL/DL) reconfiguration;
      generate a UL/DL reconfiguration command to indicate a dynamic TDD UL/DL configuration change; and
      encode the UL/DL reconfiguration command in a physical downlink control channel (PDCCH) data; and
   a radio frequency (RF) interface coupled to the processor and configured to cause the encoded UL/DL reconfiguration command to be transmitted in subframe 0 at the time interval.

2. The apparatus of claim 1, wherein the time interval comprises at least one radio frame.

3. The apparatus of claim 1, wherein the RF interface is further configured to repeat the transmitting of the encoded UL/DL reconfiguration command at the time interval to improve transmission reliability.

4. The apparatus of claim 1, wherein the UL/DL reconfiguration command is transmitted in subframe 0 or 5.

5. The apparatus of claim 1, wherein the UL/DL reconfiguration command comprises a configuration value that indicates a TDD UL/DL configuration change subsequent to the previous UL/DL reconfiguration command, wherein the processor is further configured to apply the TDD UL/DL configuration change in subframe 0.

6. The apparatus of claim 1, wherein the UL/DL configuration change is associated with a secondary serving cell (SCell) that serves the first UE, wherein the PDCCH is associated with the SCell, wherein the PDCCH comprises a UE specific control portion that carries physical layer controls for a particular UE, and wherein the encoded UL/DL reconfiguration command is transmitted in the UE specific control portion of the PDCCH.

7. The apparatus of claim 1, wherein the encoded UL/DL reconfiguration command is transmitted in the UE specific control portion of the PDCCH.

8. The apparatus of claim 1, wherein the encoded UL/DL reconfiguration command is composed of 3-bits and transmitted without hybrid automatic repeat request (HARQ).

9. The apparatus of claim 1, wherein the encoded UL/DL reconfiguration command is transmitted in the UE common control portion of the PDCCH without hybrid automatic repeat request (HARQ).

10. The apparatus of claim 1, wherein the UL/DL reconfiguration command is transmitted in a downlink control information (DCI) message according to DCI Format 1C.

11. The apparatus of claim 1, wherein the UL/DL reconfiguration command includes a TDD UL/DL reconfiguration window size.

12. An apparatus for use in a wireless communication network, comprising:
a processor configured to:
determine a time interval for periodic time division duplex (TDD) Uplink/Downlink (UL/DL) reconfiguration;
generate a UL/DL reconfiguration command to indicate a dynamic TDD UL/DL configuration change; and
encode the UL/DL reconfiguration command in a downlink control information (DCI) message according to DCI format 1C; and
a radio frequency (RF) interface coupled to the processor and configured to cause the encoded UL/DL reconfiguration command to be transmitted at the time interval.

13. The apparatus of claim 12, wherein to encode the UL/DL reconfiguration command, the processor is further configured to:
generate a Cyclic Redundancy Check (CRC) for the DCI message; and
scramble the CRC by a TDD UL/DL configuration specific Radio Network Temporary Identifier (TDD-RNTI) value,
wherein the TDD-RNTI differentiates the UL/DL reconfiguration command from other control signals in the common control portion of the PDCCH.

14. The apparatus of claim 13, wherein the scrambled CRC is appended to the DCI message.

15. The apparatus of claim 13, wherein the configuration specific TDD-RNTI is not one of the group RA-RNTI, C-RNTI, Semi-Persistent Scheduling C-RNTI, Temporary C-RNTI, TPC-PUCCH-RNTI, TPC-PUSCH-RNTI, M-RNTI, P-RNTI and SI-RNTI.

16. The apparatus of claim 13, wherein the UL/DL reconfiguration command is transmitted in subframe 0 or 5.

17. The apparatus of claim 12, wherein the DCI message includes a TDD UL/DL reconfiguration window size.

18. The apparatus of claim 12, wherein the time interval comprises at least one radio frame.

19. The apparatus of claim 12, wherein the RF interface is further configured to repeat the transmitting of the encoded UL/DL reconfiguration command at the time interval to improve transmission reliability.

20. The apparatus of claim 12, wherein the UL/DL reconfiguration command comprises a configuration value that indicates a TDD UL/DL configuration change subsequent to the previous UL/DL reconfiguration transmission, wherein the processor is further configured to apply the TDD UL/DL configuration change in subframe 0.

21. The apparatus of claim 12, wherein the UL/DL configuration change is associated with a secondary serving cell (SCell) that serves the first UE, wherein the PDCCH is associated with the SCell, wherein the PDCCH comprises a UE specific control portion that carries physical layer controls for a particular UE, and wherein the encoded UL/DL reconfiguration command is transmitted in the UE specific control portion of the PDCCH.

22. The apparatus of claim 12, wherein the encoded UL/DL reconfiguration command is transmitted in the UE specific control portion of the PDCCH.

23. The apparatus of claim 12, wherein the encoded UL/DL reconfiguration command is transmitted without hybrid automatic repeat request (HARQ).

24. The apparatus of claim 12, wherein the encoded UL/DL reconfiguration command is 3 bits long and is transmitted in the UE common control portion of the PDCCH without hybrid automatic repeat request (HARQ).

25. A method for signaling a dynamic time division duplex (TDD) Uplink/Downlink (UL/DL) allocation change in a wireless communication network, comprising:
determining a time interval for periodic TDD UL/DL reconfiguration windows;
generating a UL/DL reconfiguration command to indicate the dynamic TDD UL/DL reconfiguration change;
encoding the UL/DL reconfiguration command in a physical downlink control channel (PDCCH) data; and
transmitting the encoded UL/DL reconfiguration command in a first of the UL/DL reconfiguration windows via a PDCCH.

26. The method of claim 25, wherein the time interval comprises at least one radio frame.

27. The method of claim 25, wherein the RF interface is further configured to repeat the transmitting of the encoded UL/DL reconfiguration command at the time interval to improve transmission reliability.

28. The method of claim 25, wherein the UL/DL reconfiguration command is transmitted in subframe 0 or 5.

29. The method of claim 25, wherein the UL/DL reconfiguration command comprises a configuration value that indicates a TDD UL/DL configuration change subsequent to the previous UL/DL reconfiguration transmission, wherein the processor is further configured to apply the TDD UL/DL configuration change in subframe 0.

30. The method of claim 25, wherein the UL/DL configuration change is associated with a secondary serving cell (SCell) that serves the first UE, wherein the PDCCH is associated with the SCell, wherein the PDCCH comprises a UE specific control portion that carries physical layer controls for a particular UE, and wherein the encoded UL/DL reconfiguration command is transmitted in the UE specific control portion of the PDCCH.

31. The method of claim 25, wherein the encoded UL/DL reconfiguration command is transmitted in the UE specific control portion of the PDCCH.

32. The method of claim 25, wherein the encoded UL/DL reconfiguration command is composed of 3-bits and transmitted without hybrid automatic repeat request (HARQ).

33. The method of claim 25, wherein the encoded UL/DL reconfiguration command is transmitted in the UE common control portion of the PDCCH without hybrid automatic repeat request (HARQ).

34. A method for signaling a dynamic time division duplex (TDD) Uplink/Downlink (UL/DL) allocation change in a wireless communication network, comprising:
determining a time interval for periodic TDD UL/DL reconfiguration windows;
generating a UL/DL reconfiguration command to indicate the dynamic TDD UL/DL reconfiguration change;
encoding the UL/DL reconfiguration command in a downlink control information (DCI) message according to DCI Format 1C; and
transmitting the encoded UL/DL reconfiguration command in a first of the UL/DL reconfiguration windows via a PDCCH.

35. The method of claim 34, wherein encoding the UL/DL reconfiguration command further comprises:
 generating a Cyclic Redundancy Check (CRC) for the DCI message; and
 scrambling the CRC by a TDD UL/DL configuration specific Radio Network Temporary Identifier (TDD-RNTI) value, wherein the TDD-RNTI differentiates the UL/DL reconfiguration command from other control signals in the common control portion of the PDCCH.

36. The method of claim 35, therein the scrambled CRC is appended to the DCI message.

37. The method of claim 35, wherein the configuration specific TDD-RNTI is not one of the group RA-RNTI, C-RNTI, Semi-Persistent Scheduling C-RNTI, Temporary C-RNTI, TPC-PUCCH-RNTI, TPC-PUSCH-RNTI, M-RNTI, P-RNTI and SI-RNTI.

38. The method of claim 34, wherein the DCI message includes a TDD UL/DL reconfiguration window size.

39. The method of claim 34, wherein the time interval comprises at least one radio frame.

40. The method of claim 34, wherein the RF interface is further configured to repeat the transmitting of the encoded UL/DL reconfiguration command at the time interval to improve transmission reliability.

41. The method of claim 34, wherein the UL/DL reconfiguration command is transmitted in subframe 0 or 5.

42. The method of claim 34, wherein the UL/DL reconfiguration command comprises a configuration value that indicates a TDD UL/DL configuration change subsequent to the previous UL/DL reconfiguration transmission, wherein the processor is further configured to apply the TDD UL/DL configuration change in subframe 0.

43. The method of claim 34, wherein the UL/DL configuration change is associated with a secondary serving cell (SCell) that serves the first UE, wherein the PDCCH is associated with the SCell, wherein the PDCCH comprises a UE specific control portion that carries physical layer controls for a particular UE, and wherein the encoded UL/DL reconfiguration command is transmitted in the UE specific control portion of the PDCCH.

44. The method of claim 34, wherein the encoded UL/DL reconfiguration command is transmitted in the UE specific control portion of the PDCCH.

45. The method of claim 34, wherein the encoded UL/DL reconfiguration command is a 3-bit field and transmitted without hybrid automatic repeat request (HARQ).

46. The method of claim 34, wherein the encoded UL/DL reconfiguration command is transmitted in the UE common control portion of the PDCCH without hybrid automatic repeat request (HARQ).

* * * * *